United States Patent
Abu-Amara et al.

(10) Patent No.: US 8,612,618 B2
(45) Date of Patent: Dec. 17, 2013

(54) PEER-TO-PEER DNS NETWORKING METHOD

(75) Inventors: Marwan H. Abu-Amara, Dhahran (SA); Fahd Abdulhameed, Jeddah (SA); Farag Azzedin, Dhahran (SA); Mohammed Sqalli, Dhahran (SA); Ashraf S. Hasan Mahmoud, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 280 days.

(21) Appl. No.: 13/286,130

(22) Filed: Oct. 31, 2011

(65) Prior Publication Data
US 2013/0111049 A1 May 2, 2013

(51) Int. Cl.
*G06F 15/16* (2006.01)

(52) U.S. Cl.
USPC .......................... 709/230; 709/231; 709/232

(58) Field of Classification Search
None
See application file for complete search history.

(56) References Cited

U.S. PATENT DOCUMENTS

| 7,551,635 B2 * | 6/2009 | Mallya et al. ................. 370/408 |
| 2006/0098642 A1 * | 5/2006 | Mallya et al. ................. 370/389 |
| 2007/0165619 A1 * | 7/2007 | Reinefeld et al. ............. 370/368 |

OTHER PUBLICATIONS

Lihua Yuan, Kant, K., Mohapatra, P., Chen-Nee Chuah, DoX: A Peer-to-Peer Antidote for DNS Cache Poisoning Attacks, *Communications*, 2006. ICC ' 06. IEEE International Conference on, Jun. 2006, pp. 2345-2350.

* cited by examiner

*Primary Examiner* — Umar Cheema
(74) *Attorney, Agent, or Firm* — Richard C. Litman

(57) ABSTRACT

The peer-to-peer DNS networking method network is built over Chord protocol as a secondary path to resolve Domain Name System (DNS) queries as a solution designed to avoid an intentional blocking from higher name servers. The DNS is a critical service in the Internet infrastructure that provides user-friendly name to Internet IP address mapping services, and must be protected from abuse, since the absence of the DNS has a severe impact on several Internet applications, such as HTTP, FTP, and/or e-mail that can cause such applications to become non-functional. The method is designed to keep DNS functional during intentional blocking from higher name servers, and the like.

14 Claims, 5 Drawing Sheets

PEER-TO-PEER DNS NETWORKING METHOD

BACKGROUND OF THE INVENTION

1. Field of the Invention

The present invention relates to computer network methodologies, and particularly to a peer-to-peer DNS networking method.

2. Description of the Related Art

The Domain Name System (DNS) plays a major role in Internet connectivity by mapping a user-friendly host name to an IP address that can be dealt with by network devices. The DNS consists of a hierarchy of DNS servers with 13 root name servers at the top of the hierarchy. The IP addresses of the thirteen root name servers are hard-coded in a root hints file in every recursive or caching DNS server. DNS provides a critical core service, and its absence has a severe impact on other application-layer protocols, such as hypertext transfer protocol (HTTP), file transfer protocol (FTP), and simple mail transfer protocol (SMTP). Thus, for any network, DNS provides a vital service, and without it the network is deemed isolated and blocked from using Internet services. The DNS service could be impacted by misconfiguration causing unavailability of the DNS servers. It can also be interrupted as a result of intentional blocking from higher name servers, denial of service (DoS) attacks, cache poisoning, and compromised data. To countermeasure such attacks, researchers have proposed several remedies spanning a wide range of solutions, such as using DNS security extensions, using Anycast routing, manipulating the time-to-live (TTL) value, and increasing the efficiency of DNS caching. Yet there remains an unfulfilled need effectively countermeasure the aforementioned attacks.

Thus, a peer-to-peer DNS networking method solving the aforementioned problems is desired.

SUMMARY OF THE INVENTION

The peer-to-peer DNS networking method network is built over Chord protocol as a secondary path to resolve Domain Name System (DNS) queries as a solution designed to avoid an intentional blocking from higher name servers. The DNS is a critical service in the Internet infrastructure that provides user-friendly name-to-Internet IP address mapping services, and must be protected from abuse, since the absence of the DNS has a severe impact on several Internet applications, such as HTTP, FTP, and/or e-mail that can cause such applications to become non-functional. The dynamic round-robin peer-to-peer (P2P) solution is designed to keep DNS functional during intentional blocking from higher name servers, and the like.

These and other features of the present invention will become readily apparent upon further review of the following specification and drawings.

DETAILED DESCRIPTION OF THE PREFERRED EMBODIMENTS

Figure 1:
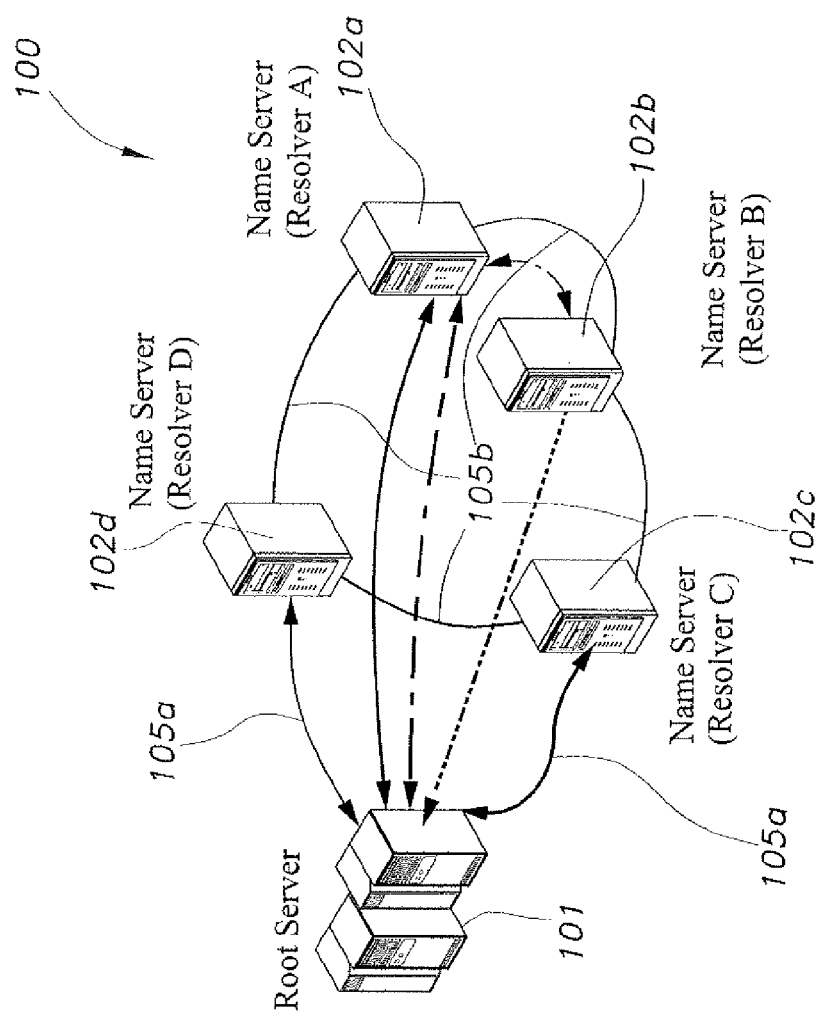
FIG. 1 is a block diagram showing an exemplary configuration of servers and network in a peer-to-peer DNS networking method according to the present invention.

A peer-to-peer (P2P) network is an overlay network that connects a group of peers with each other to share their resources (CPU, storage, content). Each peer is considered as a client and a server at the same time. This architecture provides a scalable and reliable network with the cost spread between the peers. P2P networks can be classified either as an unstructured or as a structured P2P overlay network. The unstructured P2P network consists of peers that communicate with each other through flooding without knowledge of the topology. On the other hand, each peer in the structured P2P network is associated with a subset of objects and the lookup is done through an efficient routing that is constructed by distributed routing structures, known as Distributed Hash Tables (DHT).

Chord is a structured P2P overlay protocol with a simple mechanism to build a finger table that guarantees the success of the lookup in $O(\log_2 N)$ hops where N is the network size. Chord topology comprises a flat ring with nodes distributed clockwise in the ring in the order of their identifiers (IDs) that are generated by hashing the nodes' IP addresses. The outcomes of hashing all possible lookup objects (i.e., keys) are referred to as the Chord space. The size of the Chord space is $2^m$, where m is the node ID length in binary. In the Chord protocol, each node is responsible for a subset of keys of the Chord space. This subset of keys consists of all the keys after the previous node in the ring to the current node included.

The peer-to-peer DNS networking method is a network traffic routing scheme utilizing system 100, comprising root servers 101 and a plurality of resolver/name servers 102a, 102b, 102c, and 102d. Normal DNS traffic flows over network path 105a which connects the root servers 101 to two of the name servers 102c and 102d. The system is built over Chord protocol, which utilizes a secondary path 105b to resolve Domain Name System (DNS) queries via a P2P connection among the several name server/resolvers 102a, 102b, 102c, and 102d to thereby avoid an intentional blocking from higher name servers, such as root servers 101.

The DNS is a critical service in the Internet infrastructure that provides user-friendly name to Internet IP address mapping services, and must be protected from abuse since the absence of the DNS has a severe impact on several Internet applications, such as HTTP, FTP, and/or e-mail that can cause such applications to become non-functional. The dynamic round-robin P2P solution provided by the present peer-to-peer DNS networking method is designed to keep DNS functional during intentional blocking from higher name servers, and the like.

The peer-to-peer DNS networking method uses both the Chord P2P protocol and the round-robin approach, wherein peers take turns being the DNS query resolver in round-robin fashion. Chord depends on three items of routing information that periodically get updated through a stabilization process to resolve the incoming queries. The three items of routing information include: (1) a Predecessor, which is a single record that maps to the previous node in the ring, (2) a Successor List, which is a minimum of one record mapping to the next node in the ring, and (3) a Finger Table containing selective nodes from the network that minimize the number of hops to find the successor. The finger table consists of m records (fingers) satisfying the function, $$\text{finger}_{ID}(k) = \text{successor}((ID + 2^{k-1}) \mod 2^m), \quad (1)$$

where $1 \leq k \leq m$.

The first finger in the finger table is the same as the first successor. Even though the finger table consists of m fingers, there are actually $O(\log_2 N)$ unique fingers.

Figure 5:
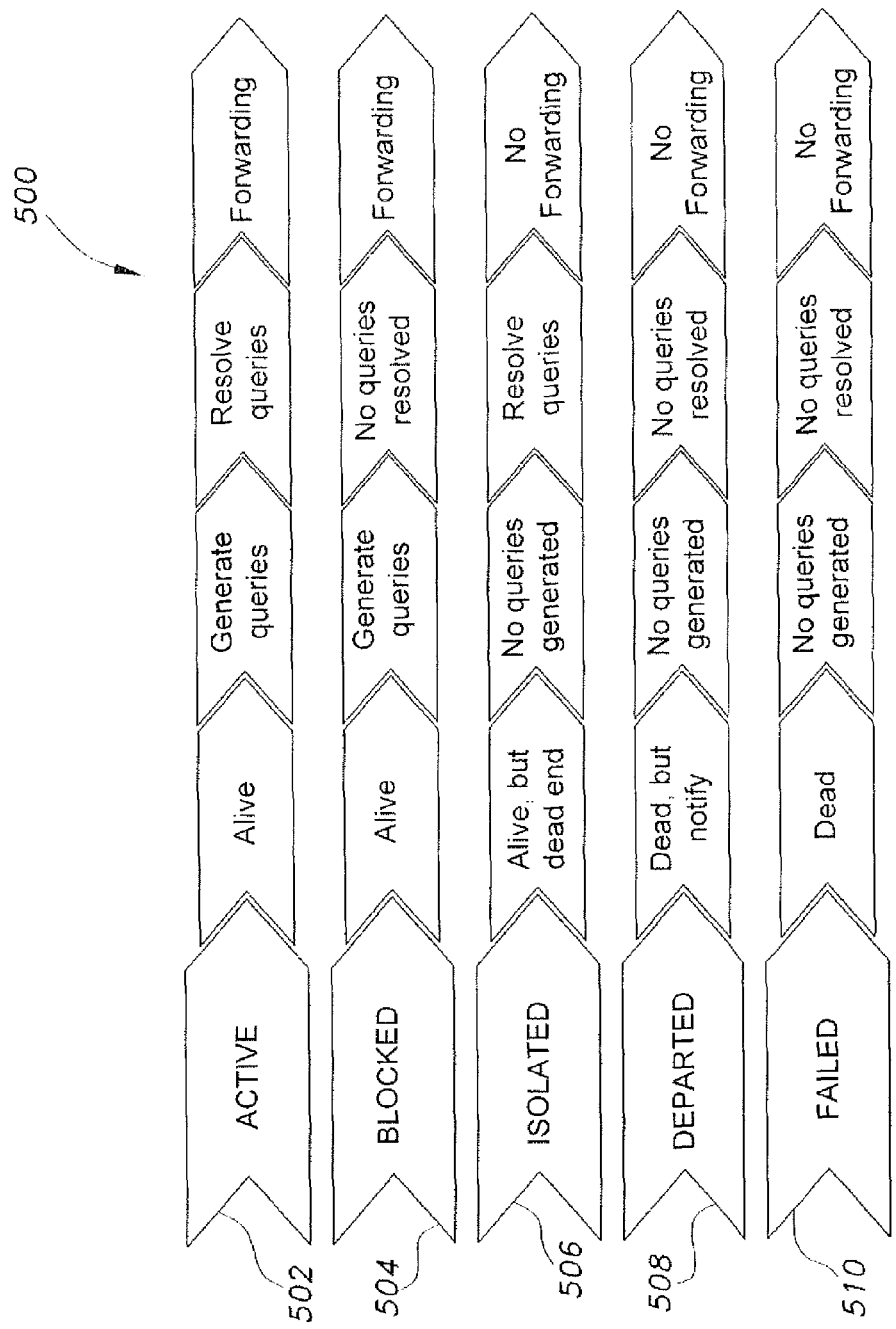
FIG. 5 is a block diagram showing the node states and their properties in a peer-to-peer DNS networking method according to the present invention, Similar reference characters denote corresponding features consistently throughout the attached drawings.

The Chord protocol arranges the peers (nodes 102a, 102b, 102c, and 102d) in a ring, and constructs a finger table that is made of a number of selective nodes in order to minimize the number of hops to the next responsible resolver node. Accordingly, the present method requires each resolver to construct a list of unique nodes from the finger table. Such a list is referred to as a routing table. In addition to using the normal DNS lookup procedure, the routing table will be used to forward the query to one node in a round-robin fashion. Inclusion in a routing table is dependent upon the state of the node. As shown in FIG. 5, node states are ACTIVE 502, BLOCKED 504, ISOLATED 506, DEPARTED 508, and FAILED 510. These states are further broken down into ALIVE and DEAD. The ALIVE nodes; i.e., ACTIVE 502, BLOCKED 504, and ISOLATED 506, have associated working functions. On the other hand, the DEAD; i.e., DEPARTED and FAILED nodes are removed from the network and no longer participate in the present method. The explanation of the five different states follows.

The ACTIVE state 502 is the default state for any node that joins the network and is considered as an ALIVE node. The node in this state can send queries, forward queries, and resolve queries.

The BLOCKED state 504 arises when an ACTIVE node discovers that it is blocked. A BLOCKED node sends a notification to its neighbors (i.e., Predecessor, and Successor) informing them that it is in the BLOCKED state 504. A BLOCKED state 504 is considered to be an ALIVE node. The node in this state can send queries, as well as forward queries. The node in this state cannot resolve queries through the normal DNS lookup procedure.

The ISOLATED state 506 is a special state when a large number of nodes fail to operate in the P2P network (>70%). Thus, some of the ACTIVE nodes will find out that all of their fingers and successors are DEAD, so it will change its state to ISOLATED. The ISOLATED state 506 is considered to be an ALIVE node. The node in this state can resolve queries. The ISOLATED state 506 node cannot send queries, nor can it forward queries.

The DEPARTED state 508 is a node state that an ALIVE state node switches to before it voluntarily departs from the network. The DEPARTED state 508 node sends a notification to its neighbors (i.e., Predecessor, and Successor) informing them that it is DEPARTED 508. A departed state 508 node is considered to be a DEAD node. The node in this state cannot send queries, forward queries, or resolve queries.

A FAILED state 510 node is formed when an ALIVE node fails, i.e., the state changes from ALIVE to FAILED. No notification is sent in this case. The FAILED state 510 node is considered to be a DEAD node. The node in this state cannot send queries, forward queries, or resolve queries.

When the query is forwarded from an ACTIVE node 502 or a BLOCKED node 504 to the next hop node, it will resolve the query through the existing DNS lookup procedure. If the next hop node is BLOCKED (i.e., the node is being intentionally denied DNS service by higher name servers), the query will not be resolved. To keep the routing table updated with ACTIVE nodes (i.e., nodes that can resolve queries through higher name servers) and minimize the number of unresolved queries, there are two modifications to the normal round-robin approach, viz., using Chord as an underlying layer, and using an enhanced round-robin. The Chord protocol is used as an underlay infrastructure to solve the scalability issue in the round-robin approach by updating (i.e., stabilizing) the finger table in the Chord protocol on a periodic basis. Also, the stabilization process is modified to support the scenario of a BLOCKED node. An enhancement to the round-robin technique is to go through the entire routing table if there are DEAD or BLOCKED nodes, which guarantees a successful lookup.

The Chord P2P protocol constructs a Successor List that is used to provide better lookup and high stability when there are failures in the network. Moreover, the use of virtual nodes may be used as known by skilled artisans to increase the fairness between the nodes. Also, the Chord P2P protocol uses two main procedures, Find Successor and Closest Predecessor, to submit a query to nodes. Accordingly, the present peer-to-peer DNS networking method comprises three modifications to the Chord P2P protocol.

Figure 2:
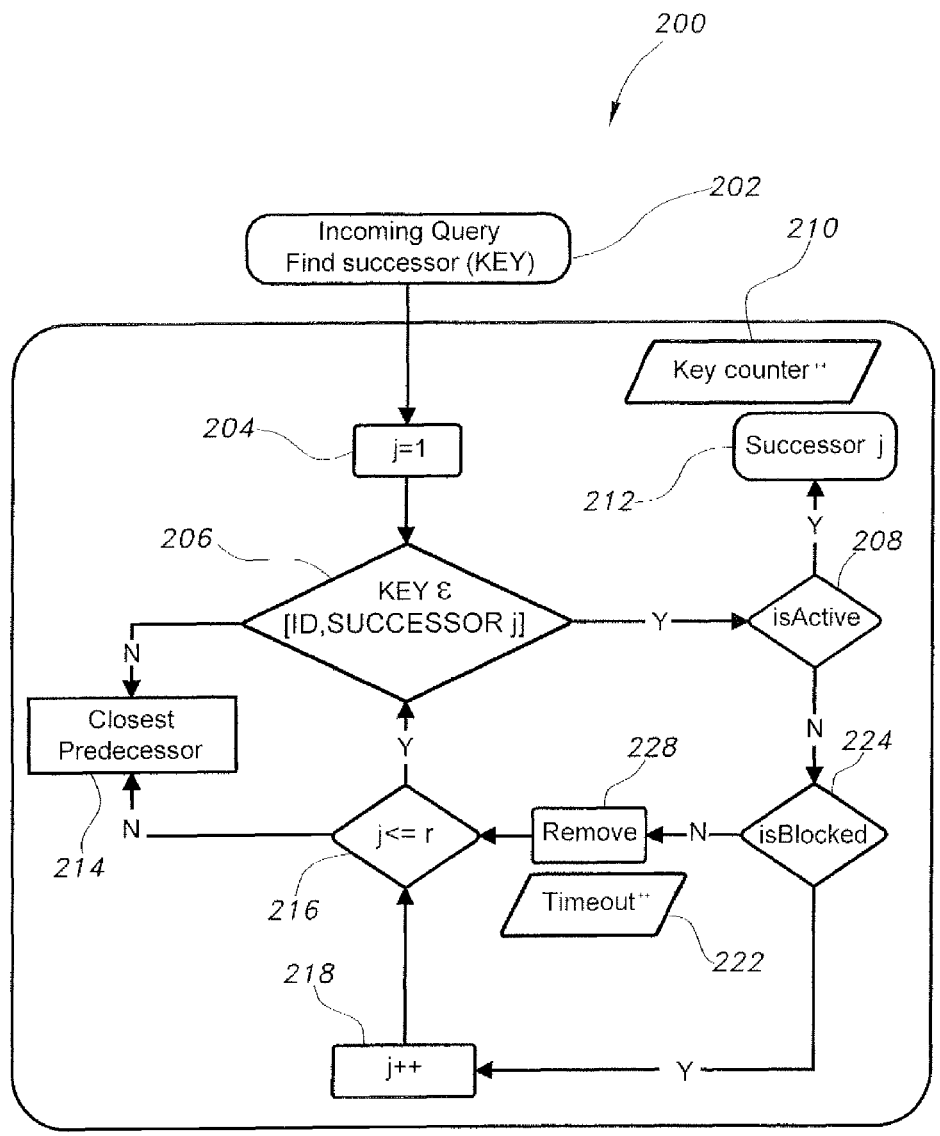
FIG. 2 is a flowchart showing a modified find successor procedure in a peer-to-peer DNS networking method according to the present invention.
Figure 3:
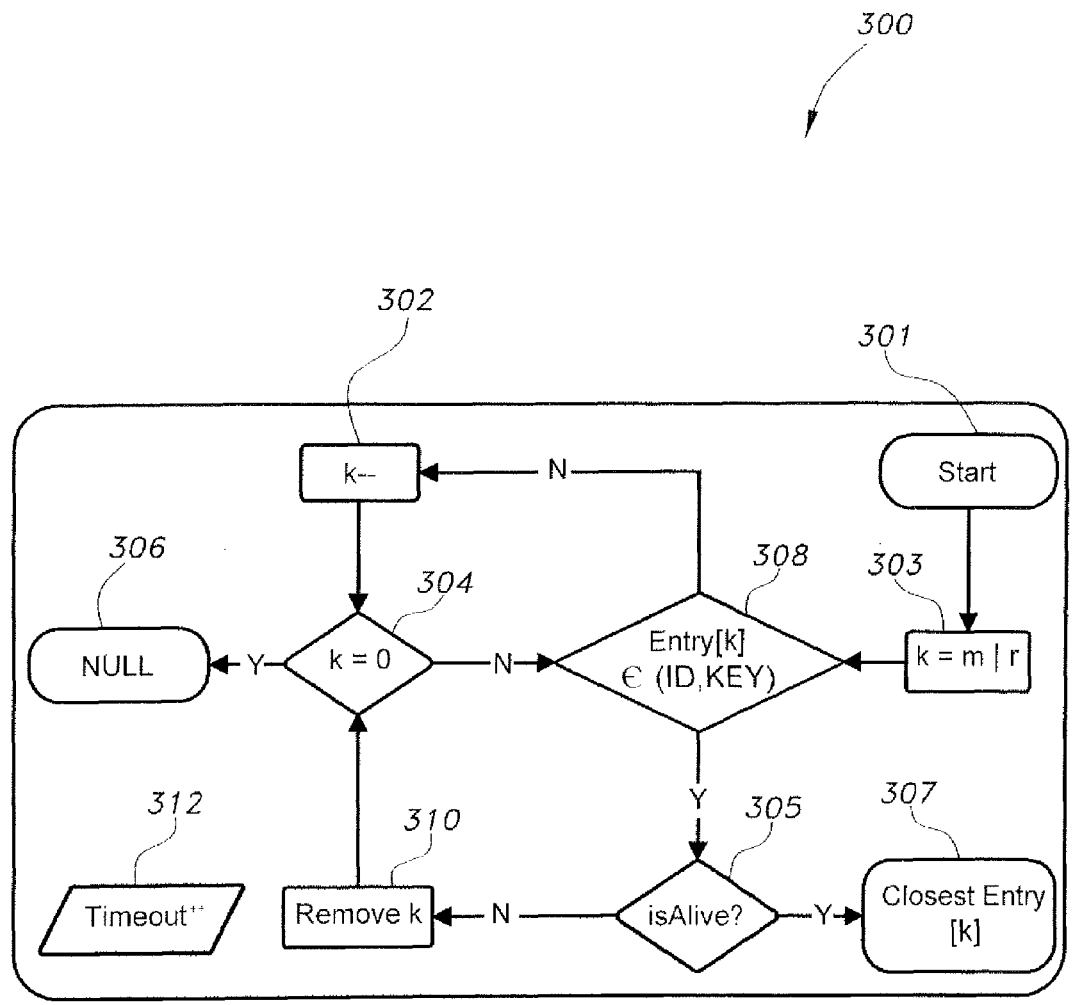
FIG. 3 is a flowchart showing a closest predecessor procedure in a peer-to-peer DNS networking method according to the present invention.

As shown in the flowchart 200 of FIG. 2, the first modification introduces a new condition to the Find Successor procedure that checks at step 224 whether the entry in the Successor List is BLOCKED or DEAD. Since the BLOCKED node cannot resolve any query, it will be flagged at step 228 of the Find Successor procedure and then subject to index test at step 216. A call at step 214 to the Closest Predecessor procedure ensues. However, the BLOCKED node will not be removed from the Successor List so as to help in the Closest Predecessor procedure (FIG. 3, 300). The BLOCKED node does not cause a timeout, since it continues to participate in the stabilization process. Incoming query step 202, key index increment step 204, key index test step 206, key counter increment step 210, successor, successor ID step 212, node activity check step 208, timeout step 222, and second key counter increment step 218 support the modified portions of the procedure.

As shown in the flowchart 300 of FIG. 3, the second modification of the present peer-to-peer DNS method extends the condition in the Closest Predecessor procedure that checks (at step 305) if the entry is ALIVE, or not to consider the BLOCKED node as an ALIVE node. Each entry in the finger table or the Successor List will be checked with the condition "Entry[k]∈ (ID, KEY)" (step 308), and when the condition is satisfied the procedure checks (at step 305) if the node is ALIVE, otherwise the node will be removed (at step 310) from the routing table. Steps 301, 302, 303, 304, 306, 307, and 312 support the aforementioned new functionality of the Closest Predecessor procedure.

Figure 4:
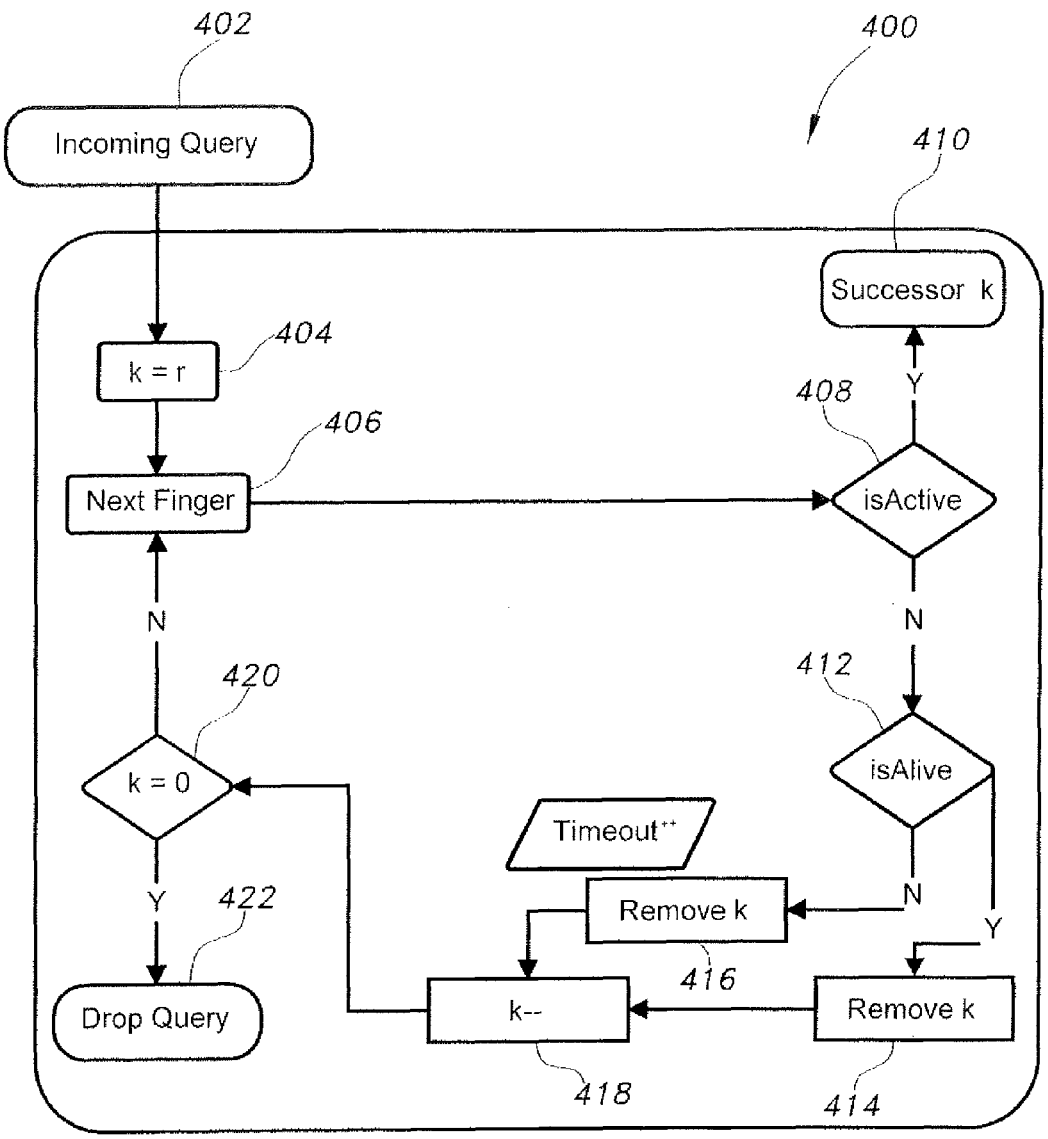
FIG. 4 is a flowchart showing a lookup process in a peer-to-peer DNS networking method according to the present invention.

The third modification ensures that the feature of notifying the predecessor and successor when a node voluntarily departs will be used also when a node is BLOCKED. As shown in the flowchart 400 of FIG. 4, to enhance the round-robin performance, the round-robin algorithm will check a window of the routing table for an incoming query 402 in each round. This window could be one entry, resulting in the basic round-robin portion of the routing table, portion of the routing table, or the complete routing table. This enhancement is applied only when the first entry in the window is DEAD or BLOCKED, as checked in step 412, or alive but blocked, as checked in the combination of steps 408 and 412. Using the lookup window, the lookup procedure will start with the first entry in the window. If this entry is either DEAD or BLOCKED, the algorithm will remove that entry (at steps 414 or 416) from the routing table. In addition, there will be a timeout at step 416 when the entry is DEAD. If, according to the test at step 420, all entries in the window have been removed, the query message will be dropped at step 422. On the other hand, the message will be considered successfully resolved if there is at least one ACTIVE entry in the window. A pointer is used in order to help in determining the window's starting point in the next round. The pointer is incremented at step 404 in a round-robin fashion after each check. Notice that the window size will be adjusted whenever the routing table size is changed.

In summary, the local DNS server (e.g., server 102b of FIG. 1) of a specific region, along with cooperating low-level DNS servers (e.g., Servers 102a, 102c, and 102d), will run the Chord protocol to establish a virtual ring among themselves. Accordingly, each of the participating DNS servers will create an ordered list of the other cooperating DNS servers. The ordered list is referred to as the finger table by the Chord protocol. In the present invention, the finger table is used to create a routing table by considering only unique nodes from the finger table. The created routing table will be used when submitting incoming DNS queries.

The local DNS server goes through the routing table in a round-robin fashion whenever it receives a DNS query that needs to be resolved from an inquiring party. The local DNS server then submits the received DNS query to both the higher-level DNS server directly and to the peer DNS server that was selected from the routing table in a round-robin fashion.

The local DNS server then waits for a response from either the higher-level DNS server, or the selected peer DNS server.

Once a response is received at the local DNS server from either the higher-level DNS server, or the selected peer DNS server, the local DNS server replies back to the inquiring party with the received response. Thus, combining the Chord protocol with the round-robin technique establishes a secondary path to resolve incoming DNS queries at the local DNS server of a specific region that is experiencing access blocking to the higher-level DNS servers.

It will be understood that the diagrams in the Figures depicting the peer-to-peer DNS networking method are exemplary only, and may be embodied in one or more servers, one or more dedicated electronic devices having microprocessors, microcontrollers, digital signal processors, application specific integrated circuits, field programmable gate arrays, any combination of the aforementioned devices, or other device that combines the functionality of the peer-to-peer DNS networking method onto a single chip or multiple chips programmed to carry out the method steps described herein, or may be embodied in a general purpose computer having the appropriate peripherals attached thereto and software stored on non-transitory computer readable media that can be loaded into main memory and executed by a processing unit to carry out the functionality of the inventive system and steps of the inventive method described herein.

It is to be understood that the present invention is not limited to the embodiments described above, but encompasses any and all embodiments within the scope of the following claims.

We claim:

1. A computer-implemented peer-to-peer Domain Name System (DNS) networking method, comprising the steps of:
   in a computer network, forming a virtual ring of DNS resolver peer nodes using a Chord protocol;
   determining, for each of the DNS resolver peer nodes, a state selected from the group of states consisting of ACTIVE, BLOCKED, ISOLATED, DEPARTED, and FAILED states;
   constructing an ordered list of the peers, the constructing step being performed by each of the DNS resolver peer nodes;
   creating a routing table from the ordered list, BLOCKED DNS resolver peer nodes BEING flagged but not removed from the ordered list, thereby minimizing a number of hops to a next responsible resolver node;
   indexing the routing table in a round-robin manner by using a window of the routing table such that it consists of one of a single entry, a portion of the routing table, the complete routing table;
   submitting a DNS query to a higher level DNS server not in the virtual ring and to a specific one of the DNS resolver peer nodes pointed to by the routing table indexing;
   receiving a response from either the higher level DNS server or the specific one of the DNS resolver peer nodes; and
   forwarding the response to an originator of the DNS query;
   whereby blockage of DNS traffic between the higher level DNS server and any combination of the DNS resolver peer nodes is eliminated via DNS traffic communicated among the DNS resolver peer nodes.

2. The computer-implemented peer-to-peer DNS networking method according to claim 1, wherein said ordered list is constructed utilizing the Chord protocol.

3. The computer-implemented peer-to-peer DNS networking method according to claim 1, further comprising the step of annotating FAILED node states in said ordered list, thereby guaranteeing a successful DNS resolver peer node lookup in said routing table.

4. The computer-implemented peer-to-peer DNS networking method according to claim 1, further comprising the step of periodically updating said ordered list with said state information for said each of said DNS resolver peer nodes.

5. The computer-implemented peer-to-peer DNS networking method according to claim 4, further comprising the step of flagging a Chord protocol successor list entry if said entry references a DNS resolver peer node that has been determined to be in a BLOCKED or DEAD state.

6. The computer-implemented peer-to-peer DNS networking method according to claim 5, further comprising the steps of:
   determining whether said Chord protocol successor list entry in said ordered list references an ACTIVE or BLOCKED node; and
   removing from said ordered list any Chord protocol successor list entry that does not reference an ACTIVE or BLOCKED node.

7. The computer-implemented peer-to-peer DNS networking method according to claim 6, further comprising the step of notifying a predecessor and a successor of the currently indexed DNS resolver peer node when the currently indexed DNS resolver peer node is in a BLOCKED state.

8. A computer software product, comprising a non-transitory medium readable by a computer having a processor, the non-transitory medium having stored thereon a set of instructions for establishing a peer-to-peer DNS networking method, the set of instructions including:
   (a) a first sequence of instructions which, when executed by the processor, causes said processor to form a virtual ring of DNS resolver peer nodes in a computer network using a Chord protocol;

(b) a second sequence of instructions which, when executed by the processor, causes said processor to determine, for each of the DNS resolver peer nodes, a state selected from the group of states consisting of ACTIVE, BLOCKED, ISOLATED, DEPARTED, and FAILED states;

(c) a third sequence of instructions which, when executed by the processor, causes said processor to construct an ordered list of each of the DNS resolver peer nodes' peers;

(d) a fourth sequence of instructions which, when executed by the processor, causes said processor to create a routing table from the ordered list, wherein BLOCKED DNS resolver peer nodes are flagged but not removed from the ordered list, thereby minimizing a number of hops to a next responsible resolver node;

(e) a fifth sequence of instructions which, when executed by the processor, causes said processor to index the routing table in a round-robin manner by using a window of the routing table such that it consists of one of a single entry, a portion of the routing table, the complete routing table;

(f) a sixth sequence of instructions which, when executed by the processor, causes said processor to submit a DNS query to a higher level DNS server not in the virtual ring and also to a specific one of said DNS resolver peer nodes pointed to by the routing table indexing;

(g) a seventh sequence of instructions which, when executed by the processor, causes said processor to receive a response from either the higher level DNS server or the specific one of the DNS resolver peer nodes; and (h) an eighth sequence of instructions which, when executed by the processor, causes said processor to forward the response to an originator of the DNS query;

whereby blockage of DNS traffic between the higher level DNS server and any combination of the DNS resolver peer nodes is eliminated via DNS traffic communicated among the DNS resolver peer nodes.

9. The computer software product according to claim 8, wherein said computer product includes a ninth sequence of instructions which, when executed by the processor, causes said processor to construct said ordered list utilizing the Chord protocol.

10. The computer software product according to claim 8, further comprising a tenth sequence of instructions which, when executed by the processor, causes said processor to annotate FAILED node states in said ordered list, thereby guaranteeing a successful DNS resolver peer node lookup in said routing table.

11. The computer software product according to claim 8, further comprising an eleventh sequence of instructions which, when executed by the processor, causes said processor to periodically update said ordered list with said state information for each of said DNS resolver peer nodes.

12. The computer software product according to claim 11, further comprising a twelfth sequence of instructions which, when executed by the processor, causes said processor to flag a Chord protocol successor list entry if said entry references a DNS resolver peer node when the node has been determined to be in a BLOCKED or DEAD state.

13. The computer software product according to claim 12, further comprising:
   a thirteenth sequence of instructions which, when executed by the processor, causes said processor to determine whether said Chord protocol successor list entry in said ordered list references an ACTIVE or BLOCKED node; and
   a fourteenth sequence of instructions which, when executed by the processor, causes said processor to remove from said ordered list any Chord protocol successor list entry that does not reference an ACTIVE or BLOCKED node.

14. The computer software product according to claim 13, further comprising a fifteenth sequence of instructions which, when executed by the processor, causes said processor to notify a predecessor and a successor of a currently indexed said DNS resolver peer node when the currently indexed DNS resolver peer node is in a BLOCKED state.

* * * * *